United States Patent [19]
Shamir

[11] Patent Number: 5,488,664
[45] Date of Patent: Jan. 30, 1996

[54] METHOD AND APPARATUS FOR PROTECTING VISUAL INFORMATION WITH PRINTED CRYPTOGRAPHIC WATERMARKS

[75] Inventor: Adi Shamir, Rehovot, Israel

[73] Assignee: Yeda Research and Development Co., Ltd., Rehovot, Israel

[21] Appl. No.: 231,933

[22] Filed: Apr. 22, 1994

[51] Int. Cl.⁶ .................................................. G09C 5/00
[52] U.S. Cl. ............................ 380/54; 380/3; 380/23; 380/55; 283/73; 283/113; 283/17
[58] Field of Search ............................ 380/3, 4, 23, 51, 380/54, 55, 59; 283/73, 113, 17, 901

[56] References Cited

U.S. PATENT DOCUMENTS

| | | | |
|---|---|---|---|
| 2,952,080 | 9/1960 | Avakian et al. | 380/54 |
| 3,227,474 | 1/1966 | Hoeflinger | 283/73 X |
| 3,675,948 | 7/1972 | Wicker | 283/901 X |
| 3,827,726 | 8/1974 | McVoy et al. | 283/75 |
| 4,175,775 | 11/1979 | Kruegler | 283/901 X |
| 4,586,711 | 5/1986 | Winters et al. | 273/138 R |
| 4,659,113 | 4/1987 | Müller et al. | 283/901 X |
| 4,682,954 | 7/1987 | Cook | 380/54 |
| 4,776,013 | 10/1988 | Kafri et al. | 380/54 |
| 4,921,278 | 5/1990 | Shiang et al. | 283/901 X |
| 5,184,849 | 2/1993 | Taylor | 283/901 X |
| 5,301,981 | 4/1994 | Nesis | 283/73 |

FOREIGN PATENT DOCUMENTS

| | | | |
|---|---|---|---|
| 0260815 | 3/1988 | European Pat. Off. | G09C 5/00 |
| 940498 | 10/1963 | United Kingdom. | |
| 959976 | 6/1964 | United Kingdom. | |
| 2172850 | 10/1986 | United Kingdom | B42D 15/02 |

*Primary Examiner*—Bernarr E. Gregory
*Attorney, Agent, or Firm*—Keck, Mahin & Cate

[57] ABSTRACT

A method and device for protecting visual information against unauthorized access and modification using a printed cryptographic watermark includes printing a first array of shapes on a first sheet of material to be protected and printing a second array of shapes on a second sheet of material, which is transparent so as to form a developer for developing a watermark encoded in a combination of the first and second arrays of shapes. The watermark is encoded by preparing each array using black and white pixels. Each pixel, which may be a square, rectangle, circle, hexagon or other shape, is split into first and second collections of subpixels, the first collection of subpixels appearing in the first array of shapes and the second collection of subpixels appearing in the second array of shapes. When the transparent second sheet of material is positioned directly on top of the first sheet of material with the second array of shapes aligned with the first array of shapes, the first sheet of material may be viewed through the transparent second sheet of material. In this manner, the encoded watermark, which was not visible in either one the two individually, becomes visible. Additionally, a first image may be encoded in the first sheet, a second image may be encoded in the second sheet, and the watermark may be viewed as a third image that is visible in the combination of the first and second sheets.

18 Claims, 4 Drawing Sheets

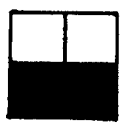   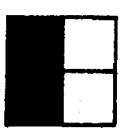 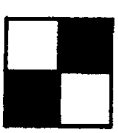 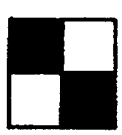
FIG.2A  FIG.2B  FIG.2C  FIG.2D  FIG.2E  FIG.2F
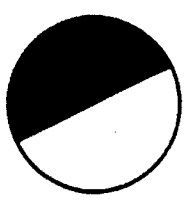 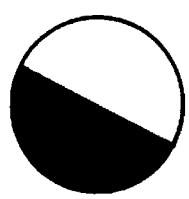 
FIG.3A  FIG.3B  FIG.3C
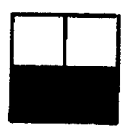   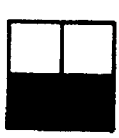 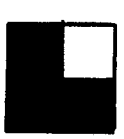   
FIG.4A  FIG.4B    FIG.4C  FIG.4D    FIG.4E  FIG.4F
   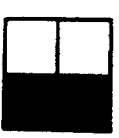    
FIG.4G  FIG.4H    FIG.4I  FIG.4J    FIG.4K  FIG.4L
        
FIG.5A    FIG.5B    FIG.5C

METHOD AND APPARATUS FOR PROTECTING VISUAL INFORMATION WITH PRINTED CRYPTOGRAPHIC WATERMARKS

FIELD OF THE INVENTION

The invention relates to the protection of visual information against unauthorized access and modification by using printed cryptographic watermarks and methods for preparing printed cryptographic watermarks for protecting visual information.

BACKGROUND OF THE INVENTION

The following techniques for protecting visual information against unauthorized access and modification are known:

A. Digital cryptographic techniques in which the visual information is first digitized. The result can be digitally encrypted and digitally signed by known techniques. This technique is expensive, since the digital image requires a large memory and its processing requires a personal computer or similar device.

B. Exotic printing techniques in which visual information is printed with unusual inks on unusual types of paper or other sheet material. These techniques are often used to print money, stock certificates and official documents. Verification of whether a document is forged may require a well-stocked laboratory and well-trained personnel and is not cost effective for small batches of privately produced documents.

C. Holograms, embossed letters and erasure-resistant backgrounds are often used for credit cards or similar devices to deter forgeries. Criminals can easily overcome such protective mechanisms.

D. Code books may be used for encoding a small number of possible images by using secret numeric equivalents which are printed either together with or instead of the actual image. Such a scheme is practical only if the list of possible images is fixed in advanced and the coding technique is very simple. Such a system cannot be adapted to arbitrary images.

SUMMARY OF THE INVENTION

The purpose of the invention is to produce a printed watermark which provides reasonable security against unauthorized access to and modification of visual information at very low costs. The cryptographic printed watermarks of the invention can be produced by standard laser or ink-jet printers and can be verified directly by the human visual system without using any cryptographic knowledge, computational devices or chemical processes. The watermark consists of an array of printed shapes which appears to be random, and the developer consists of another array of printed shapes, which also appears to be random, printed on a transparent medium. When the transparent developer is placed over the printed watermark, a hidden image becomes clearly visible.

A method and device for protecting visual information using a printed cryptographic watermark includes printing a first array of shapes on a first sheet of material to be watermarked and printing a second array of shapes on a second sheet of material which is transparent and which forms a developer for a watermark encoded in a combination of the first and second arrays of shapes. The watermark is encoded by preparing an array of black and white pixels. Each pixel, which may be a square, rectangle, circle, hexagon or other shape, is split into first and second collections of subpixels, the first collection of subpixels appearing at the same location in the printed watermark and the second collection of subpixels appearing in the transparent developer. When the transparent second sheet of material is positioned directly on top of the first sheet of material, with the second array of shapes aligned with the first array of shapes, and the first sheet of material is viewed through the transparent second sheet of material, the encoded watermark becomes visible. In another variant of the invention, the two arrays may not look random. That is, a first image may be encoded in the first sheet, a second image may be encoded in the second sheet and a third image may be visible in the combination of the first and second sheets. Typical applications of such a cryptographic watermark include:

1. Protecting the signature area in bank cards. Any signature sample can be visually compared by any bank teller equipped with the bank's developer. The watermark on the signature area of the bank card is invisible to potential forgers who want to misuse lost or stolen cards.

2. Protecting printed information in passports and on identification cards against unauthorized modifications by use of a watermark. If the invisible location of each piece of information in the watermark is randomly chosen in each document, the forger does not know which part to modify.

3. Authenticating tickets to rock shows or sports events by printing watermarks which include the serial number of the ticket and the seat number. This data can be verified at the entrance to the event.

4. Expiration dates and shipping instructions can be embedded in printed labels attached to merchandise. In this way, such information can be viewed by authorized personnel only.

In a preferred embodiment of the invention, the visual image is a rectangular array of black and white pixels, which are processed independently. Each pixel is split into two collections of subpixels. One collection appears in the printed watermark and one collection appears in the transparent developer, wherein black subpixels are opaque and white subpixels are transparent. When the developer is placed over the watermark, a superimposed collection of black subpixels is seen at each pixel, corresponding to the union of the black subpixels in each of the two collections. The subpixels in each collection are printed in close proximity to each other so that the human visual system averages their black/white contributions. The crucial observation is that the perceived gray level of the combined collection is not necessarily equal to the sum of the perceived gray levels of the individual collections, and thus the image seen in the superimposed collection may be completely unrelated to the images seen in the two individual collections.

An object of the invention is to provide a security apparatus including an encoded watermarked sheet in which the watermark is rendered visible by viewing the watermarked sheet through a developer sheet placed on top of and aligned with the watermarked sheet.

A further object of the invention is to provide a method for encoding a first sheet of material with a watermark and to provide a method for encoding a second sheet of material with a developer pattern which, when placed on top of and aligned with the first sheet of material, enables the hidden watermark to be visible to a viewer.

Another object of the invention is to prevent unauthorized access to and modification of visual information in a way which provides reasonable security at very low cost.

BRIEF DESCRIPTION OF THE DRAWINGS

FIGS. 2a–2f are plan views of six square pixels, divided into two black and two white subpixels.

FIGS. 3a and 3b are plan views of two circular pixels, divided into a black half circle and a white half circle.

FIG. 3c is a plan view of the pixels of FIGS. 3a and 3b stacked together.

FIGS. 4a–4l are plan views depicting combinations of twelve further rectangular pixels, each divided into four subpixels.

FIGS. 5a, 5b and 5c are plan views of three hexagonal pixels, each divided into three black and three white subpixels.

DETAILED DESCRIPTION OF THE PREFERRED EMBODIMENTS

Figure 1A:
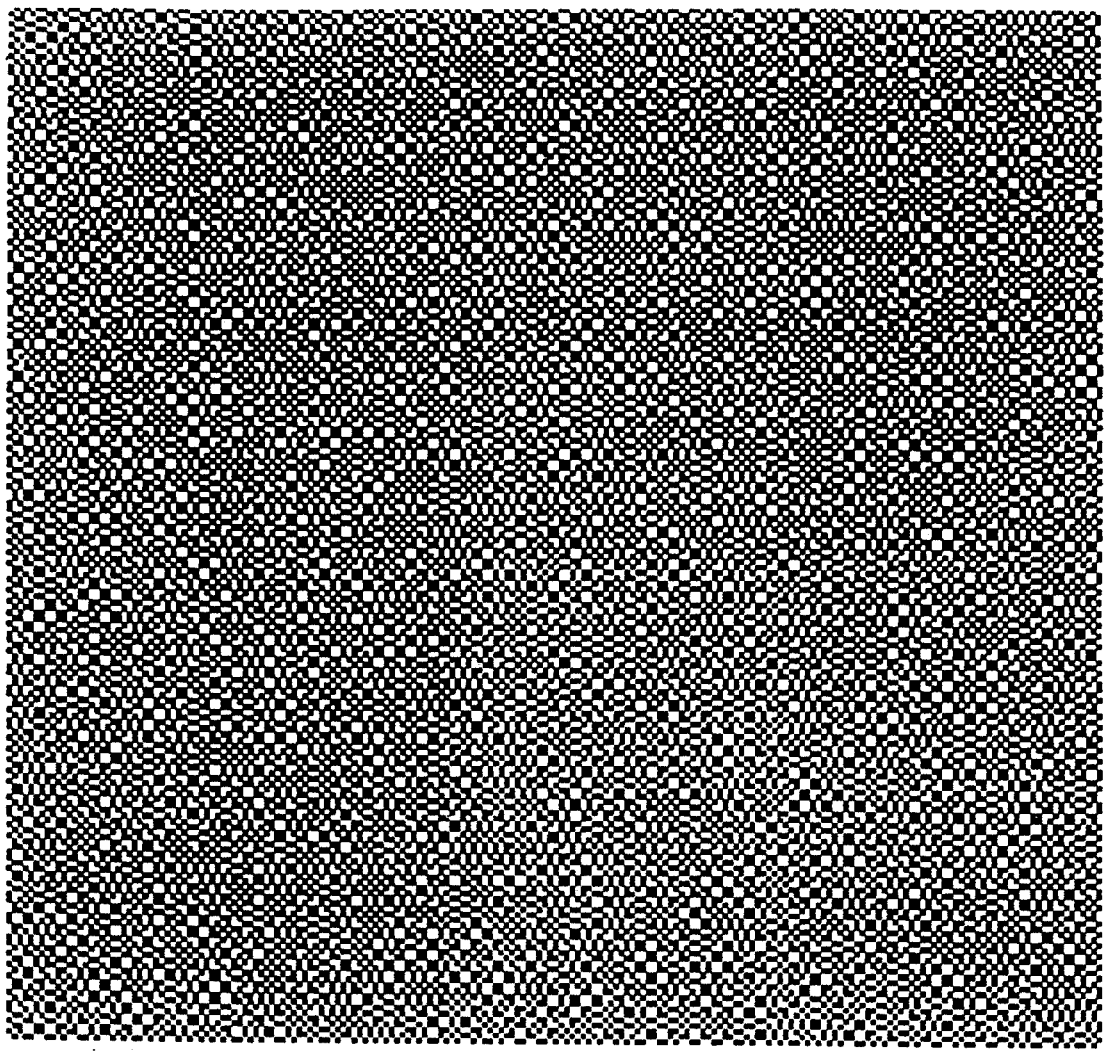
FIG. 1a is an example of a pattern of pixels for a watermark.
Figure 1B:
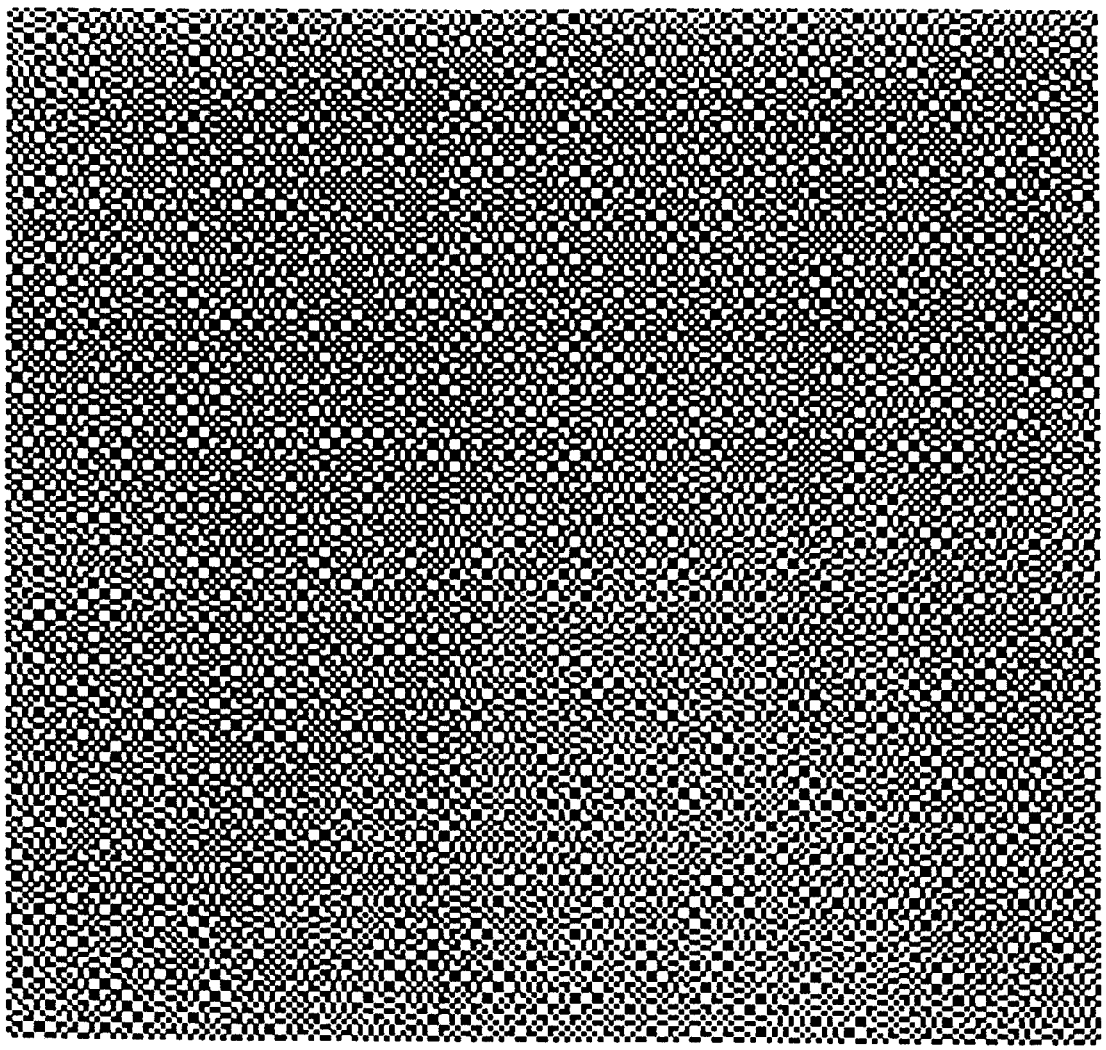
FIG. 1b is an example of a pattern of pixels for a developer.
Figure 1C:
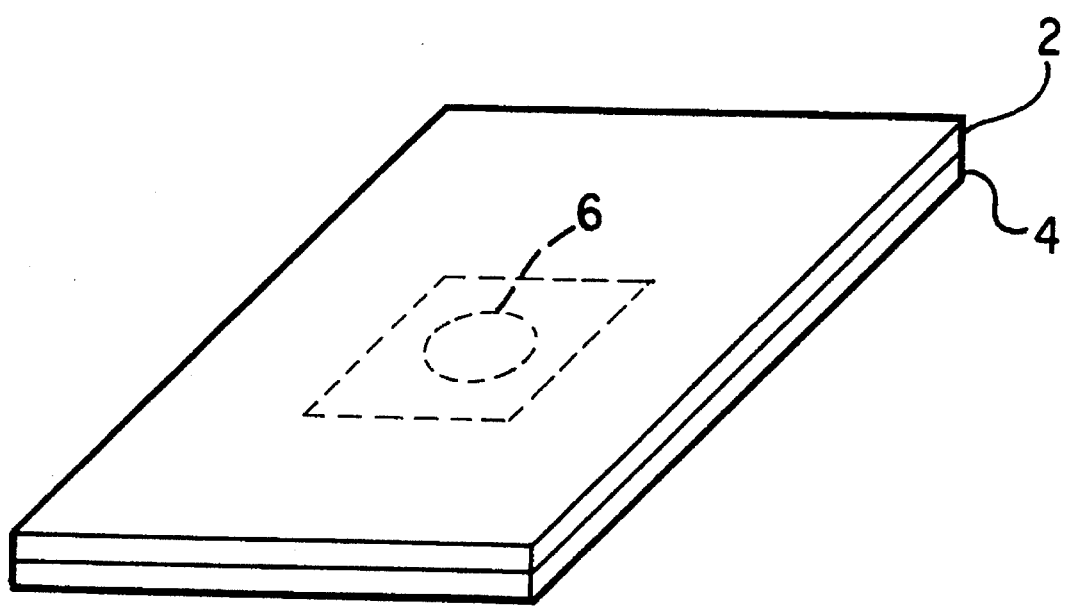
FIG. 1c illustrates a device of the invention.

With reference to the drawings which illustrate a typical watermark and developer and various pixels and subpixels, FIG. 1a illustrates an array of subpixels forming a typical printed watermark and FIG. 1b illustrates an array of subpixels forming a typical printed developer. The hidden image is completely invisible in each of the two arrays. If FIG. 1b is photocopied onto a transparency 2 and then placed on top of and aligned with sheet 4 having a watermark printed thereon, FIG. 1a, as shown in FIG. 1c, a viewer looking through FIG. 1b of the transparency, illustrating the developer, onto FIG. 1a of the watermark, sees the hidden image of a circle 6, which is the watermark encoded in the apparently random array of shapes that makes up FIGS. 1a and 1b. The subpixels of the arrays of FIGS. 1a and 1b are rectangles each pixel formed of two black subpixels and two white subpixels.

FIGS. 2a through 2f show six typical subarrays or collections of subpixels, magnified in size. Each one of these 2×2 collections appears to be medium gray to a viewer since, in reduced size, the eye sees the adjacent two black shapes and two white shapes as medium gray in color. When two identical 2×2 collections are superimposed, such as superimposing any one of FIGS. 2a to 2f on itself, the result still contains only two black subpixels and still looks medium gray. When two complementary 2×2 collections are superimposed, such as superimposing FIG. 2a on FIG. 2b, FIG. 2c on FIG. 2d, or FIG. 2e on FIG. 2f, the result contains four black subpixels and looks completely black. When any other pair of 2×2 collections are superimposed, such as superimposing FIG. 2a on any one of FIGS. 2c to 2f, the result contains three black subpixels and looks dark gray. As a result, arbitrary images can be created by superimposing two uniformly gray images, each composed of an array of 2×2 collections from FIGS. 2a to 2f).

To create a universal developer for arbitrary rectangular images which are n×m in size, the user generates a 2n×2m array D of subpixels, in which each 2×2 subarray ($D_{2i,2j}$, $D_{2i,2j+1}$, $D_{2i+1,2j}$, $D_{2i+1,2j+1}$) for $0 \leq i < n$, $0 \leq j < m$ is randomly and independently chosen from the 6 possible collections in FIGS. 2a to 2f. To create the 2n×2m watermark W which encodes a particular n×m black and white image A, the user chooses ($W_{2i,2j}$, $W_{2i,2j+1}$, $W_{2i+1,2j}$, $W_{2i+1,2j+1}$) which is the same as ($D_{2i,2j}$, $D_{2i,2j+1}$, $D_{2i+1,2j}$ $D_{2i+1,2j+1}$) if $A_{ij}$ is white, and the color complement of ($D_{2i,2j}$, $D_{2i,2j+1}$, $D_{2i+1,2j}$, $D_{2i+1,2j+1}$) if $A_{ij}$ is black. Neither D nor W contain any trace of image A, independtly but their superposition is a clearly visible rendition of image A. For examples, when W is the watermark shown in FIG. 1a and D is the developer shown in FIG. 1b, A is the circle which is visible when a transparent image of FIG. 1b is superimposed on and aligned with FIG. 1a.

Many enhancements and extensions of the preferred embodiment described above are possible. For example, only the diagonal pair of structures, shown in FIGS. 2e and 2f, need be used. Visual experiments indicate that alignment errors become less visible when vertical and horizontal arrays of subpixels are used in the following chessboard arrangement: FIGS. 2a and 2b are used in D and W whenever i+j is even, and FIGS. 2c and 2d are used in D and W whenever i+j is odd. Larger 3×3 arrays of subpixels, for example, likewise may be used. Hexagonal arrays also may be used instead of rectangular arrays, such as shown in FIGS. 5a, 5b and 5c, for example. Colours other than black and white may be used in the pixels and subpixels. Other arrangements will be apparent to those skilled in the art.

In another embodiment, images which consist of three gray levels (black, gray and white) can be directly encoded using the basic technique. Continuous tone images can be made by representing each original pixel by its gray level $0 \leq g < 256$ as an 8×8 array of g black and 256-g white subpixels, and then splitting each subpixel into a pair of 2×2 arrays of subpixels using the basic technique above.

A more direct and elegant way to create a watermark having continuous tone images is described with respect to FIGS. 3a through 3e. Using the examples shown in FIGS. 3a through 3c, each pixel in either the watermark or the developer is represented by a rotated half circle, such as shown by example in FIGS. 3a and 3b. When the two half circles are carefully aligned, the superposition of the two half circles can range in color from medium gray (representing black and white) to completely black (representing black) depending on the relative angle between the two rotated black half circles. Thus, for example, if FIG. 3a is superposed on FIG. 3b as developer and watermark, respectively, the arrangement shown in FIG. 3c appears. If, for each developer pixel, a random angle r is chosen, a corresponding angle s for the watermark pixel can be calculated which yields the desired gray level designated by the relative angle r-s between the two rotated half circles. Both the watermark and the developer look uniformly gray, but in superposed position, the appearance can be any desired continuous tone image.

Another embodiment of the invention allows images to be concealed. For example, a first sheet of material may be printed with an image of, for example, a house. A second transparent sheet of material may be printed with an image of, for example, a dog. The developer (transparency) image of the dog may be superimposed on the watermark image of the house and a hidden image may then be seen with no trace of either the house or the dog being visible. To construct such a scheme, a more complex collection of 2×2 subarrays of subpixels is used, as shown in FIGS. 4a to 4l. In the individual images, subarrays having two black subpixels are considered to be white and subarrays having three black subpixels are considered to be black. In the superimposed image, subarrays having three black subpixels are considered to be white and subarrays having four black subpixels are considered to be black. If the desired superimposed result is white, a combination presented by FIGS. 4a/4b (representing white+white), 4c/4d (representing white+ black) or 4*e*/4*f* (representing black+black) may be used. If the desired superimposed result is black, a combination presented by FIGS. 4*g*/4*h* (representing white+white), 4*i*/4*j* (representing white+ black) or 4*k*/4*l* (representing black+ black) may be used. Using this choice of arrays, the watermark and the developer can each contain an arbitrary image. When these images are carefully aligned, the two superimposed images dissolve and an unrelated third image, which was completely invisible in either the watermark or the developer, becomes visible.

While the invention has been described with respect to certain embodiments thereof, it will be appreciated by one skilled in the art that variations and modifications may be made without departing from the spirit and scope of the invention.

What is claimed is:

1. A method for protecting visual information against unauthorized access and modification using a printed cryptographic watermark, the method comprising the steps of:

printing a first array of shapes on a first sheet of material to be protected;

printing a second array of shapes on a second sheet of material, wherein said second sheet of material is transparent and forms a developer for developing the cryptographic watermark encoded in a combination of the first and second arrays of shapes;

positioning the second sheet of material directly on top of the first sheet of material with the second array of shapes aligned with the first array of shapes;

viewing the first sheet of material through the second transparent sheet of material, whereby the cryptographic watermark, which was not visible in either one of the first and second sheets when viewed individually, becomes visible.

2. A method according to claim 1 further comprising the step of:

encoding the cryptographic watermark in the combination of the first and second arrays of shapes using black and white pixels, each pixel being split into first and second collections of subpixels, the first collection of subpixels appearing in the first array of shapes and the second collection of subpixels appearing in the second array of shapes.

3. A method according to claim 2, wherein each pixel is a square.

4. A method according to claim 3, wherein each pixel includes four square subpixels arranged in a 2×2 array.

5. A method according to claim 2, wherein each pixel is a rectangle.

6. A method according to claim 2, wherein each pixel is a circle.

7. A method according to claim 6 wherein the subpixels of each pixel include a white half circle and a black half circle, the positioning step including aligning the first and second arrays of shapes so that the half circles in the subpixels of the second collection overlap the half circles in the subpixels of the first collection to create a desired tone for display of the cryptographic watermark.

8. A method according to claim 2, wherein each pixel is a hexagon.

9. A method according to claim 1 further comprising the step of displaying a first encoded image in the first array of shapes and a second encoded image in the second array of shapes, and further wherein the cryptographic watermark viewed by the viewing step is a third encoded image which is not visible in either one of the first and second sheets when viewed individually, the third encoded image becoming visible in the combination of the second array of shapes superposed on the first array of shapes.

10. A device for protecting visual information against unauthorized access and modification using a printed cryptographic watermark, the device comprising:

a first sheet of material having a first array of shapes printed thereon, the first sheet of material including the visual information to be protected;

a second sheet of material having a second array of shapes printed thereon, the second sheet of material being transparent so as to form a developer for developing the cryptographic watermark when the second sheet of material is positioned on top of the first sheet of material, the second array of shapes aligned with the first array of shapes so as to display the cryptographic watermark in a superimposed combination of the first and second arrays of shapes when the first sheet of material is viewed through the second sheet of material, wherein the cryptographic watermark is not visible in either one of the first and second sheets when viewed individually.

11. A device according to claim 10, wherein the first and second arrays of shapes are formed of black and white pixels, each pixel is split into first and second collections of subpixels, the first collection of subpixels appearing in the first array of shapes and the second collection of subpixels appearing in the second array of shapes.

12. A device according to claim 11, wherein each pixel is a square.

13. A device according to claim 12, wherein each pixel includes four square subpixels arranged in a 2×2 array.

14. A device according to claim 11, wherein each pixel is a rectangle.

15. A device according to claim 11, wherein each pixel is a circle.

16. A device according to claim 15, wherein the subpixels of each pixel include a white half circle and a black half circle, the first and second arrays of shapes being aligned so that the half circles in the subpixels of the second collection overlap the half circles in the subpixels of the first collection to create a desired tone for display of the cryptographic watermark.

17. A device according to claim 11, wherein each pixel is a hexagon.

18. A device according to claim 10, wherein the first array of shapes includes a first encoded image and the second array of shapes includes a second encoded image, and further wherein the cryptographic watermark is a third encoded image which is not visible in either one of the first and second sheets when viewed individually, the third encoded image becoming visible in the combination of the second array of shapes superposed on the first array of shapes.

* * * * *